April 29, 1941.  E. P. SMITH  2,239,937
BAIT PROTECTOR
Filed Jan. 10, 1939
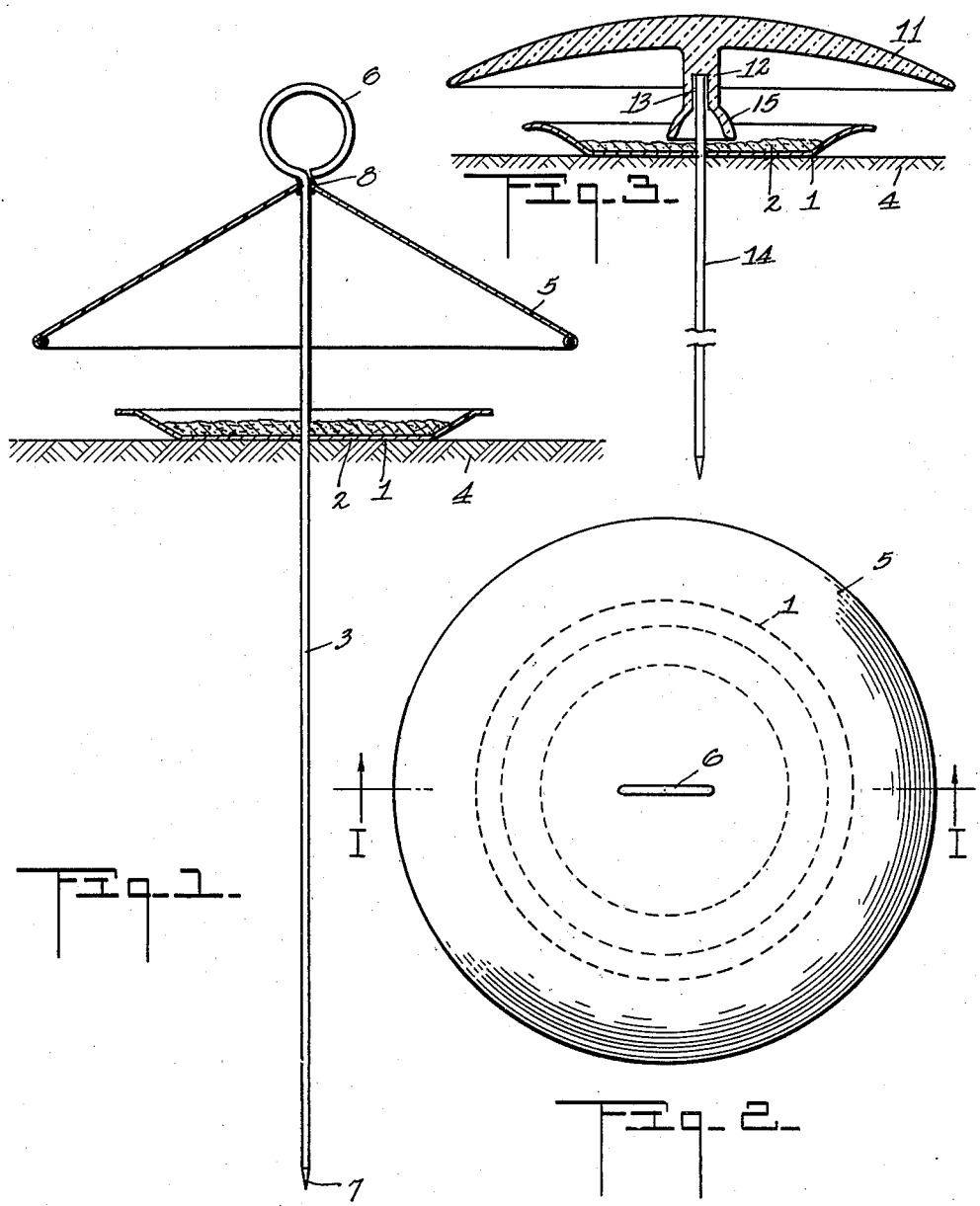
INVENTOR.
EDITH PHILLIPS SMITH
BY Schapp & Cole
ATTORNEYS.

Patented Apr. 29, 1941

2,239,937

UNITED STATES PATENT OFFICE 2,239,937

BAIT PROTECTOR

Edith Phillips Smith, Berkeley, Calif.

Application January 10, 1939, Serial No. 250,144

2 Claims. (Cl. 43—131)

The present invention relates to improvements in a bait protector and its principal object is to provide a protector for a well-known brand of snail or slug poison which consists of a saw dust or bran-like carrier saturated with poison and which is used by placing small heaps on the soil surface at spaced points in the infested regions.

Where the poison is thus disposed, the small heaps are accessible to larger animals such as cats and dogs, the poison is likely to be washed out by rain-fall, and the snails or slugs feeding on the poison die in the immediate vicinity and leave a slimy, unsightly mass. It is also dangerous to spread this poison near small fruits and vegetables used for food, such as strawberries, lettuce, etc.

In my invention it is proposed to provide a simple, inexpensive protector for the heaps of poison, which keeps the latter out of contact with the soil, forms a roof over the poison to protect the latter from rain and sunshine, renders it inaccessible for larger animals, allows each heap of poison to be handled as a unit, for movement from place to place or for removal into the garbage can, safely confines the poison to a limited area, facilitates locating of the poison for checking purposes, prevents trampling of the bait by man or animal and forms an attractive unit which rather lends itself to decorative purposes by giving splashes of color to the garden in which it is used.

Further objects and advantages of my invention will appear as the specification proceeds.

The preferred forms of my invention are illustrated in the accompanying drawing in which Fig. 1 shows a vertical section through my device as applied to the earth surface, Fig. 2, a top plan view of the same, and Fig. 3, a vertical section through a modified form of my invention.

While I have shown only the preferred forms of my invention it should be understood that various changes or modifications may be made within the scope of the claims attached hereto without departing from the spirit of the invention. More particularly the use of my invention is not confined to the protection of snail poison but may be used for other purposes such as the protection of ant poison or the like.

In its preferred form my invention comprises a dish 1 on which the poison may be placed as at 2, a spike 3 which may be driven through the dish into the soil indicated at 4, and a hood 5 carried by the spike, with a handle 6 disposed above the hood.

The dish 1 may be made of any suitable material such as cardboard or thin metal, in which latter case the hole through which the spike passes may be pre-formed. The spike 3 is preferably made of considerable length, say about 16 inches, and is pointed at its lower end as at 7, which its upper end is formed into the loop 6 or any other suitable shape for facilitating the handling of the device.

The hood 5 is preferably conical in shape and is attached to the spike immediately below the loop 6, as at 8, and in co-axial relation to the spike; the hood should be larger in its lower diameter than the dish as shown in the drawing, and when the spike is driven home the hood should be spaced sufficiently from the soil surface to allow snails and slugs to pass underneath the roof formed by the hood while keeping out larger animals.

The application of the device is very simple. A small amount of poison, say a spoonful, is placed in the dish and the latter is set on the soil surface in the place desired. Thereupon the spike is placed with its point approximately in the center of the dish and is driven through the dish into the soil, whereby the dish is nailed to the soil and is firmly held in position. When the hood reaches the proper position with respect to the soil surface the spike is stopped in its descent and the assembly is completed.

It will also be noted that in the use of my device the bait is kept out of contact with the soil and remains clean, is protected from rain, sprinkling, sunshine and accidental trampling, and that the amount of moisture in the bait is subject to control.

It is easy to remove the bait from one place to another, by merely pulling out the spike and re-inserting it, and to dispose of the used bait by dropping it with the dish into the garbage can. My device allows the poison to be readily located for checking the kill and the poison may be safely used even in close proximity to plants intended for food. The hood renders the poison inaccessible to larger animals so that the poison will not be disturbed by and constitute a danger to cats and dogs and the like.

In the form shown in Figures 1 and 2 the hood is preferably made of a suitable metal such as copper. In the modified form of Figure 3 I provide a hood 11 made as a clay product. In this case the hood is made a separate and removable part of the device and is provided with a central stem 12 projecting downwardly and having a central portion cored out as at 13 to receive the upper end of the spike 14. The stem is formed with an annular skirt 15 which leads to the cored section and facilitates the positioning of the hood relative to the spike.

The hood, being made as a clay product, lends itself to many attractive variations in color and thus may be used to add a decorative feature to the garden in which it is used.

I claim:

1. In a bait protector of the character described, a spike having a smooth exterior surface and a pointed lower end, whereby the spike may be made to pierce a bait-containing dish and driven into ground beneath the dish, and a substantially conical-shaped hood mounted axially on the spike and having its apex secured to the latter and its rim presented toward the pointed end of the spike, the exterior surface of the spike from its pointed end to the hood being unobstructed, whereby the spike may be driven into the ground even to the extent of bringing the rim of the hood into contact with the ground.

2. In a bait protector, a spike having a smooth exterior surface and a pointed lower end, whereby the spike may be made to pierce a bait-containing dish and driven into ground beneath the dish, and a hood mounted on the spike and having its rim presented toward the pointed end of the spike, the exterior surface of the spike from its pointed end to the hood being unobstructed, whereby the spike may be driven into the ground even to the extent of bringing the rim of the hood into contact with the ground.

EDITH PHILLIPS SMITH.